J. HARTNESS.
STOP MECHANISM FOR METAL WORKING MACHINES.
APPLICATION FILED SEPT. 7, 1911.
1,036,106.
Patented Aug. 20, 1912.
3 SHEETS—SHEET 3.
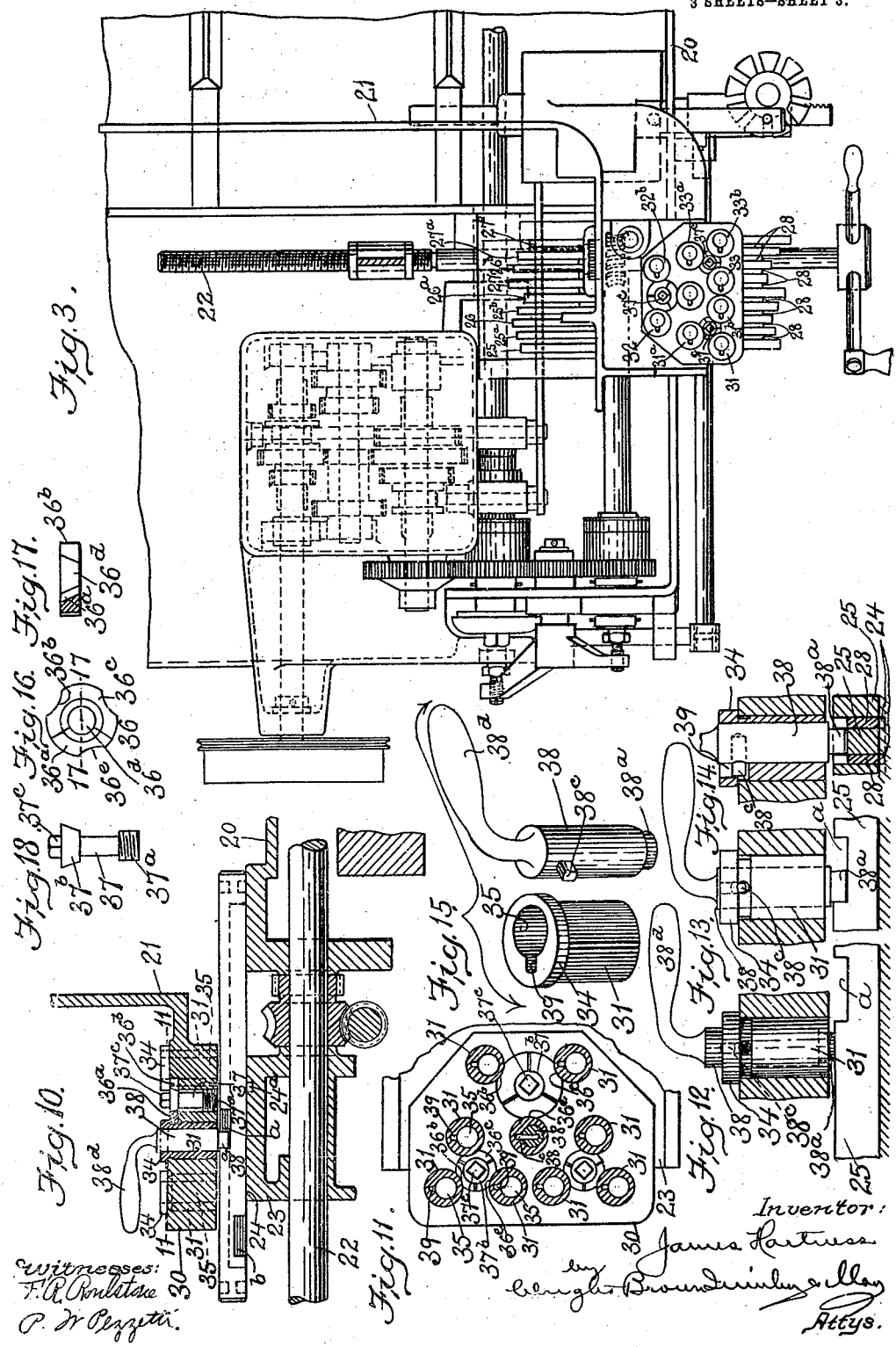

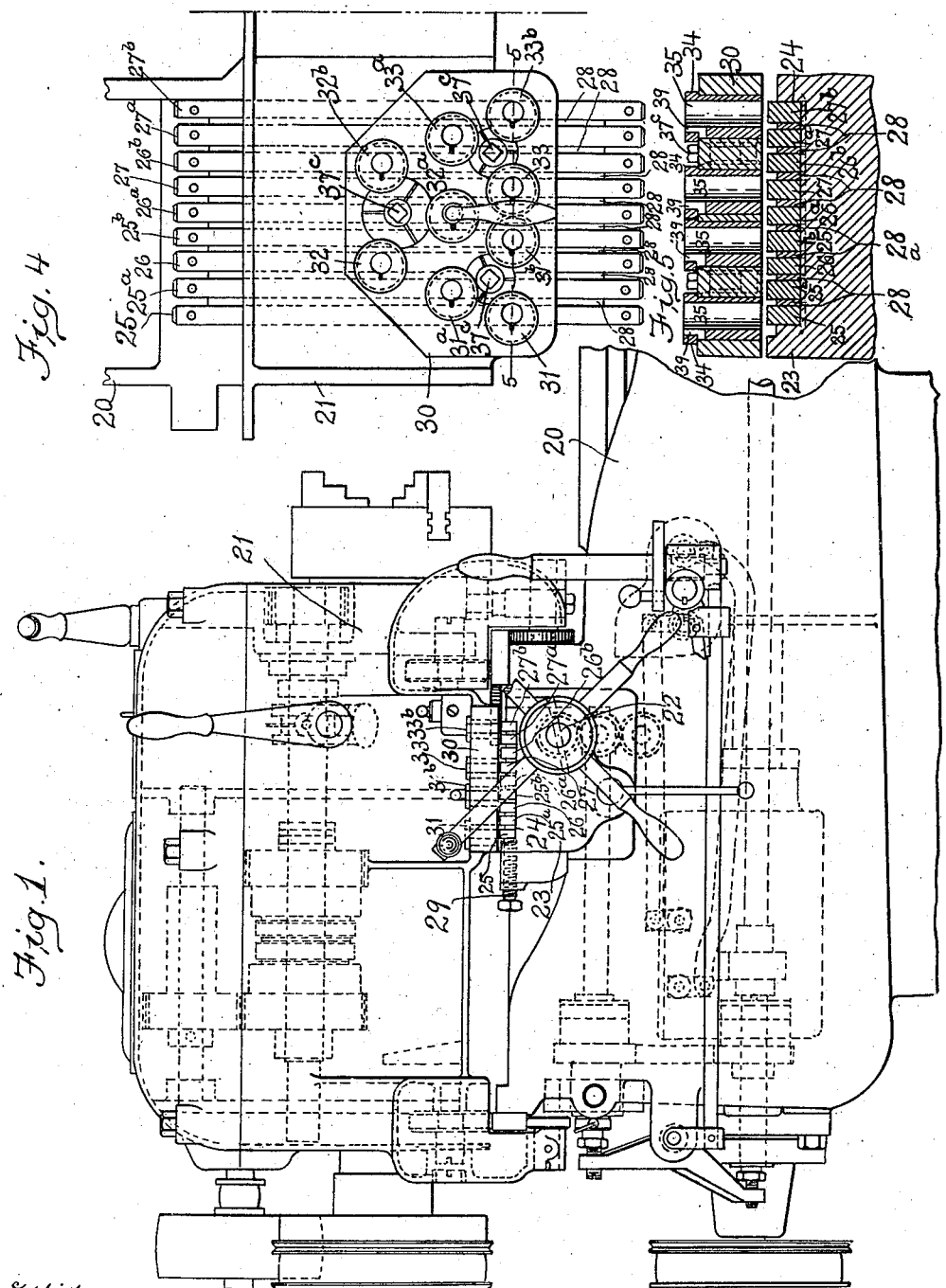

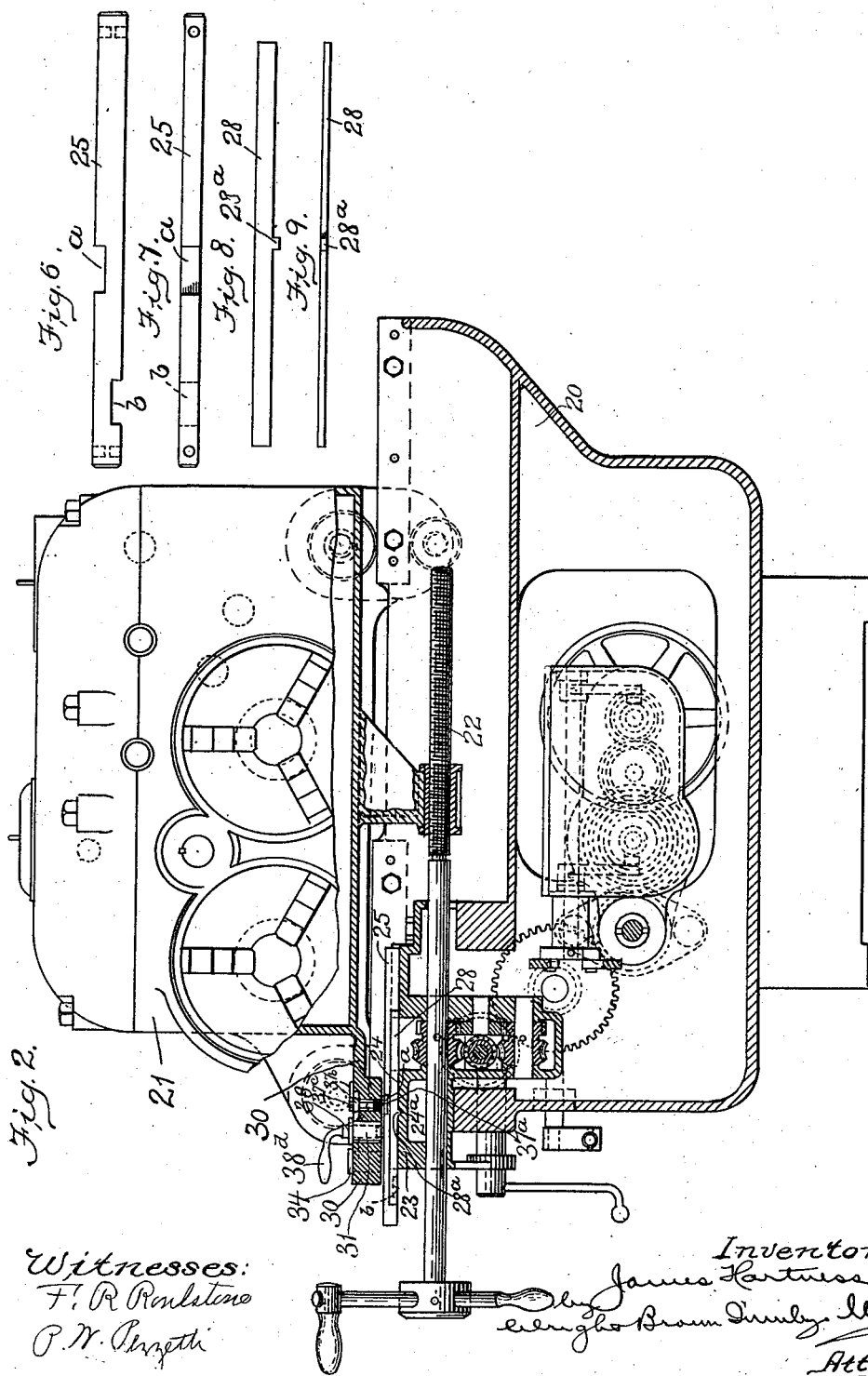

UNITED STATES PATENT OFFICE.

JAMES HARTNESS, OF SPRINGFIELD, VERMONT.

STOP MECHANISM FOR METAL-WORKING MACHINES.

1,036,106.  Specification of Letters Patent.  Patented Aug. 20, 1912.

Application filed September 7, 1911. Serial No. 648,167.

*To all whom it may concern:*

Be it known that I, JAMES HARTNESS, a citizen of the United States, and resident of Springfield, in the county of Windsor and State of Vermont, have invented certain new and useful Improvements in Stop Mechanism for Metal-Working Machines, of which the following is a specification.

This invention has relation to metal-working machines, and more especially to stop mechanisms for determining the extent of travel of one of the movable carriages of the machine. In machines such as illustrated in my previous Patent No. 792,591, dated June 20, 1905, or 771,242, dated October 4, 1904, the extent of movement of the carriage is determined by a series of stop bars mounted upon the bed, with which may be engaged coöperating stops on a movable carriage. The carriage may be either the tool carriage which reciprocates longitudinally on the bed, or a cross-sliding head or carriage which supports the work. In some cases both the tool carriage and the work carriage are provided with stops for coacting with the stop bars located on the bed.

For economy of space it is desirable that the stop bars on the bed should be located close together and yet in an accessible position where they may be easily adjusted lengthwise by the operator in accordance with the character of the cut being made upon the work. In accordance with the present invention I provide a carriage with a plurality of groups of socket members each of which is adapted to receive a stop member so that the member may be located to engage any one of the stop bars on the bed and limit the movement of the carriage. Preferably each of the socket members is adjustable longitudinally with respect to its corresponding stop bar on the bed, and by arranging the socket members in groups I am able to provide a clamp for clamping in their adjusted positions all of the socket members of each group.

On the accompanying drawings which illustrate one embodiment of the invention: Figure 1 represents a front side elevation of the head end of a lathe equipped with my improved stop mechanism. Fig. 2 represents a vertical transverse section through the same, taken in the vertical plane of the feed screw. Fig. 3 represents a plan view of the end portion of the bed with the head or carriage removed. Fig. 4 (Sheet 1) shows in plan view the stop bars on the bed and the socket members on the carriage. Fig. 5 represents a section on the line 5—5 of Fig. 4. Figs. 6 and 7 (Sheet 2) illustrate side and plan views of one of the stop bars. Figs. 8 and 9 represent similar views of one of the spacers. Fig. 10 represents an enlarged section through the stop mechanism on the same plane as that on which Fig. 2 is a section. Fig. 11 represents a section on the line 11 11 of Fig. 10. Figs. 12, 13 and 14 illustrate in detail a stop bar, one of the socket members, and the stop pin which is inserted through the socket member. Fig. 15 shows perspectively one of the socket members and the stop pin. Figs. 16 and 17 illustrate one of the clamps for a group of socket members, Fig. 17 being a section on line 17—17 of Fig. 16. Fig. 18 illustrates the spreading bolt for spreading the screw of the bolt.

The same reference characters indicate the same or similar parts wherever they occur.

I have illustrated the invention as being utilized in connection with the cross-sliding head or work carriage, but it will be understood that it is equally applicable to the tool carriage.

Referring to the drawings: The bed of the lathe is indicated at 20, and the carriage at 21. The carriage is mounted to move transversely of the bed upon tracks or guides provided at the end of the bed as described in my co-pending application, Serial No. 647,873, filed concurrently herewith. The carriage is provided with one or more work spindles to which power may be applied by any convenient mechanism. The lathe is further equipped with a tool slide which is movable longitudinally of the bed, as illustrated in either of the patents to which I have hereinbefore referred. The work carriage is moved transversely of the bed by hand or by power through the medium of a feed screw 22.

Immediately below the head the bed is formed with a table 23 having a relatively wide shallow groove 24 for the reception of stop bars which may be arranged therein in parallelism. These stop bars are indicated at 25, 25ª, 25ᵇ, 26, 26ª, 26ᵇ, 27, 27ª, 27ᵇ; but their number may be increased or diminished as desired. Each stop bar consists of a metallic strip rectangular in cross section, and in its top and bottom it is provided with notches a, b, as shown in Fig. 6, so that the stop bar may be reversed to bring either of the notches uppermost, in consequence of which each stop bar may be adjusted to bring a notch in any one of a great variety of positions. The said stop bars are separated by spacers 28 which consist of narrow metallic strips alternating with the stop bars, as shown in Figs. 3 and 5. The stop bars and spacers are all bound frictionally together by set screws 29 passed through the side of the table so as to engage the outer stop bar of the series and laterally compress the stop bars and spacers. By releasing the set screws 29 the stop bars may be adjusted, turned upside down, or reversed end for end, so as to locate either one of the notches on the bar in any position to stop the movement of the carriage at any point that may be desired. I find it desirable to lock the spacers to the bed to prevent their moving endwise when the stop bars are adjusted longitudinally, and to this end the under side of each spacer is provided with a tongue or projection $28^a$ which extends downward into a groove $24^a$ formed in the table and extending transversely of the series of stop bars and spacers (see Fig. 2). By reason of this construction, while the spacer bars are held against longitudinal movement, they are free to be moved laterally when the binding screws 29 are forced inwardly to frictionally bind the spacers and stop bars together.

The carriage, on its front side, is formed with a substantially horizontal web or flange 30 which is located above the table 23 but in close proximity thereto, as illustrated in Figs. 1, 2 and 10. This web or flange constitutes a support for the socket members. These socket members are illustrated as being arranged in groups of three, as indicated at 31, $31^a$, $31^b$, 32, $32^a$, $32^b$, 33, $33^a$, $33^b$, so that they register with the corresponding stop bars 25, $25^a$, $25^b$, 26, $26^a$, $26^b$, 27, $27^a$, $27^b$, as best shown in Fig. 4. Each socket may consist of a bushing which is inserted in a cylindrical aperture in the support 30 and is provided at its upper end with a peripheral flange 34 which will overlap and rest upon the top of the support to prevent the bushing from dropping through the aperture therein. Each bushing has an eccentric bore or aperture 35. These bushings are arranged in the apertures in the support so that the bore of each one is immediately above and in registration with its corresponding stop bar, and each bushing is so located that by slightly rotating it in one direction or the other its bore 35 will be adjusted to a slight extent longitudinally of the stop bar.

The socket members or bushings of each group are simultaneously clamped against rotation by a clamp consisting of a split or segmental ring 36 having the segments $36^a$, $36^b$, $36^c$. The ring as a whole is formed with a beveled bore $36^d$ through which may be inserted a spreading screw 37 having its lower enlarged threaded end $37^a$ screwed into a threaded aperture in the support 31. This screw has a peripherally beveled collar or flange $37^b$ which will engage the beveled portions of the segments of the ring and spread them radially into engagement with the bushings. Each one of the segments has a concavity $36^e$ in its peripheral portion to engage the periphery of the adjacent bushing. The spreading screw has an angular head $37^c$ which may be engaged by a socket wrench to rotate it and release or bind the segments of the ring 36.

Into each of the socket members may be inserted a stop member which consists of a pin 38 having a reduced end $38^a$ which will project below the lower end of the bushing and ride upon the top of the corresponding stop bar so as to drop into the notch a or b of such stop bar and limit the movement of the carriage by engaging one of the shoulders at the end of the notch. The stop pin is provided with a lateral projection or finger $38^c$ which may rest upon the shoulder formed by the upper end of the socket member so as to hold the end $38^a$ of the pin in inactive position in a horizontal plane above the upper surface of the stop bar. Each of the socket members, however, is provided with an internal slot 39 to receive the finger or projection $38^c$ and permit the pin 38 to drop into active position. The stop pin is provided with a lateral handle $38^d$ which affords a convenient means for the operator to remove the stop pin from one bushing and insert it in another, or to rotate it to bring the finger or projection $38^c$ into registration with the slot 39 in the bushing, and to rotatively adjust said bushing.

From the foregoing description it will be seen that the stop bars and spacers may be narrow so as to occupy a contracted space on the bed, and that by grouping the socket members they too occupy a relatively small space. It will also be noted that by having the threaded portion $37^a$ of the spreading screw of a greater diameter than the remainder thereof, the upper portion of the screw may spring in one direction or the other when the screw is driven home so as to bear with equality of pressure against the several segments of the clamping ring with which it is engaged.

The rotative adjustability of the socket members provides for a nice adjustment of the stop pin relatively to the stop bar with which it is to engage, so that the operator may adjust the stop bar to approximate position, and then secure an accurate operation by adjusting the stop pin and bushing.

It will be noticed that in this particular embodiment of the invention the stop mechanism is located above the feed screw near one of the ways or rails on which the carriage is movable.

Having thus explained the nature of my said invention and described a way of constructing and using the same, although without attempting to set forth all the forms in which it may be made or all the modes of its use, what I claim is:

1. In a lathe the combination with a bed, and a series of stops thereon, of a carriage movable on said bed and having a plurality of open sockets, and a stop pin insertible in any one of said sockets and adapted to project therethrough to engage any one of said stops.

2. In a lathe the combination with a bed and a series of stops thereon, of a carriage movable on said bed, a plurality of rotatively adjustable eccentric socket members thereon, and a stop pin insertible in any one of said socket members.

3. In a lathe, the combination with a bed and a carriage, of a series of stops on one of said instrumentalities, a like number of socket members arranged about a center in a group on the other of said instrumentalities, and a removable stop insertible in any one of said socket members for engagement with the corresponding stop of the said first mentioned series.

4. In a lathe, the combination with a bed and a carriage, of a series of stops on one of said instrumentalities, a like number of socket members arranged about a center in a group on the other of said instrumentalities, a clamp common to all of said socket members, and a removable stop pin insertible in any one of said socket members.

5. In a lathe the combination with a bed and a series of parallel stop bars thereon, of a carriage movable on said bed longitudinally of said bars, groups of socket members on said carriage, each group consisting of members arranged around a center, and each member registering with one of the stop bars, and means adapted for insertion in said members to engage said stop bars.

6. In a lathe the combination with a bed and a series of parallel stop bars thereon, of a carriage movable on said bed longitudinally of said stop bars, groups of socket members on said carriage, each group consisting of members arranged around a center, and each member registering with one of the stop bars, a clamp for the members of each group, and means adapted for insertion in said members for engagement with said stop bars.

7. In a lathe the combination with a bed and a series of parallel stop bars thereon, of a carriage movable on said bed longitudinally of said stop bars, groups of socket members on said carriage, each group consisting of a plurality of rotatably adjustable eccentric bushings, and each bushing registering with one of said stop bars, a clamp for the bushings of each group, and means adapted for insertion in said members for engagement with the stop bars.

8. In a lathe the combination with a bed and a series of parallel stop bars thereon, of a carriage movable on said bed longitudinally of said stop bars, groups of socket members on said carriage, each group consisting of a plurality of rotatably adjustable eccentric bushings, and each bushing registering with one of said stop bars, a clamp for the bushings of each group, and a pin adapted for insertion in any one of said bushings for engagement with the corresponding stop bar.

9. In a lathe, a bed having a group of independently adjustable stops, a carriage movable on said bed and having a group of socket members corresponding to said stops, said group consisting of rotatably adjustable eccentric bushings, a stop pin for insertion in any one of said bushings for engagement with its corresponding stop, and a clamp for said group of socket members comprising a sectional ring and spreading screw for spreading the sections of said ring into engagement with said bushings.

10. In a lathe, a bed having a stop, a carriage having a cylindrical aperture, an eccentric bushing located in said aperture and rotatively adjustable therein, said bushing having a shoulder and a slot, and a stop pin insertible in said bushing and having a lateral projection to rest on said shoulder or to extend into said slot, substantially as set forth.

11. The combination of a sliding carriage having a stop, a bed, a series of parallel longitudinally adjustable stop bars located on said bed, a series of spacers on said bed alternating with said stop bars, said spacers and said bed having a complemental transverse tongue and groove connection, and means for laterally binding said spacers and stop bars in frictional engagement.

12. The combination of a sliding carriage having a stop, a bed, a series of parallel longitudinally adjustable stop bars located on said bed, a series of spacers on said bed alternating with said stop bars, means for laterally binding said stop bars and spacers in frictional engagement, and means for securing said spacers to said bed to hold them against longitudinal movement without interfering when said stop bars are longitudinally adjusted.

13. In a lathe the combination with a bed and a carriage, of a plurality of parallel independently adjustable stop bars arranged in the same plane on one of said instrumentalities, a stop member on the other of said instrumentalities, said last-mentioned instrumentality having a series of sockets for the reception of said stop member, and means for adjusting said stop member thereon longitudinally of said stop bars.

In testimony whereof I have affixed my signature, in presence of two witnesses.

JAMES HARTNESS.

Witnesses:
  G. W. CLACE,
  J. W. WALKER